(12) United States Patent
Baughman et al.

(10) Patent No.: US 7,784,266 B2
(45) Date of Patent: Aug. 31, 2010

(54) METHODS AND SYSTEMS FOR SUPPLYING AIR TO A VEHICLE

(75) Inventors: John Lewis Baughman, Cincinnati, OH (US); Rollin George Giffin, Cincinnati, OH (US); Ronald Burton Steinmetz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 900 days.

(21) Appl. No.: 11/612,247

(22) Filed: Dec. 18, 2006

(65) Prior Publication Data

US 2008/0141654 A1 Jun. 19, 2008

(51) Int. Cl.
*B63H 11/00* (2006.01)
(52) U.S. Cl. ........................... 60/204; 60/226.1
(58) Field of Classification Search ............ 60/204, 60/226.1, 226.2, 226.3, 785, 795
See application file for complete search history.

(56) References Cited

U.S. PATENT DOCUMENTS

| 5,794,432 | A | 8/1998 | Dunbar et al. |
|---|---|---|---|
| 5,809,772 | A | 9/1998 | Giffin, III et al. |
| 5,867,980 | A | 2/1999 | Bartos |
| 6,339,927 | B1 | 1/2002 | DiPietro, Jr. |
| 6,684,626 | B1 | 2/2004 | Orlando et al. |
| 6,901,739 | B2 | 6/2005 | Christopherson |
| 7,055,306 | B2 | 6/2006 | Jones et al. |
| 7,134,271 | B2 | 11/2006 | Baughman et al. |
| 7,140,174 | B2 | 11/2006 | Johnson |
| 2005/0210863 | A1* | 9/2005 | Wollenweber et al. ......... 60/224 |
| 2007/0000232 | A1 | 1/2007 | Powell et al. |
| 2008/0245050 | A1* | 10/2008 | Wollenweber .............. 60/39.15 |

* cited by examiner

*Primary Examiner*—Michael Cuff
*Assistant Examiner*—Vikansha S Dwivedi
(74) *Attorney, Agent, or Firm*—William Scott Andes, Esq.; Armstrong Teasdale LLP

(57) ABSTRACT

A method of supplying air to a vehicle is provided, wherein the method includes modulating a flow of air from between a fan assembly of a turbofan engine and a high pressure compressor of the turbofan engine with a core driven fan stage coupled in parallel to the high pressure compressor. The method also includes channeling the air from the core driven fan stage to the vehicle.

15 Claims, 3 Drawing Sheets

US 7,784,266 B2

METHODS AND SYSTEMS FOR SUPPLYING AIR TO A VEHICLE

BACKGROUND OF THE INVENTION

This invention relates generally to vehicles including a turbofan engine and, more particularly, to methods and systems for supplying air to the vehicle.

At least some known military air mobility systems use air from a propulsion system to enhance the operational characteristics of high lift devices on the vehicle. In such systems, the air source must provide a sufficient quantity of air at moderate pressures and temperatures. Moreover, the quantity of air must be easily modulated from its maximum levels to zero flow, as air flow at maximum levels is utilized under high lift conditions and zero air flow is utilized under forward flight conditions.

At least some known propulsion systems use air systems that provide only low pressure air. Specifically, these known systems channel low pressure air from a fan assembly in the engine. Because of the relatively low pressure of the air, these known propulsion systems generally require a large quantity of air resulting in the need for relatively large air systems to pass the low pressure air. Other known systems that channel air from high pressure compressor at higher pressures and temperatures than desired. Specifically, these systems channel air from various stages of the compressor. Generally, both the compressor and the air system require modulation of the air quantity to affect a transition between the modes of operation for the compressor and the air system. As a result of the modulation, air flow and pressure to the engine system turbine is decreased. Accordingly, engine performance is altered. Further, costly components are often required because of the higher temperature air.

BRIEF DESCRIPTION OF THE INVENTION

In one aspect, a method of supplying air to a vehicle is provided, wherein the method includes modulating a flow of air from between a fan assembly of a turbofan engine and a high pressure compressor of the turbofan engine with a core driven fan stage coupled in parallel to the high pressure compressor. The method also includes channeling the air from the core driven fan stage to the vehicle.

In a further aspect, an air supply system for a vehicle having a turbofan engine is provided, wherein the system includes a core driven fan stage coupled in parallel with a high pressure compressor of the turbofan engine. The core driven fan stage is configured to modulate a flow of air from between a fan assembly of the engine and the high pressure compressor and channel the air to the vehicle.

In another aspect, a turbofan engine for a vehicle is provided, wherein the engine includes a fan assembly, a high pressure compressor, and an air supply system. The system includes a core driven fan stage coupled in parallel with the high pressure compressor. The core driven fan stage is configured to modulate a flow of air from between the fan assembly and the high pressure compressor and channel the air to the vehicle.

DETAILED DESCRIPTION OF THE INVENTION

The present invention provides a method and system for supplying air to a vehicle. Specifically, the system includes a core driven fan stage mechanically coupled in parallel with a high pressure compressor of a turbofan engine. The core driven fan stage enables air to be channeled from between a fan assembly of the turbofan engine and the high pressure compressor for use by the vehicle. An inlet guide vane, described in more detail below, modulates the discharge air flow to the vehicle. The present invention facilitates supplying higher pressure air to the vehicle than known turbofan engine assemblies that receive air from the fan assembly. As such, an overall passage size of a vehicle air distribution system is facilitated to be reduced in comparison to known air systems. Further, present invention facilitates supplying air to the vehicle at relatively lower temperatures than known turbofan engine assemblies that receive air from the compressor. In addition, the relatively lower air temperature enables the vehicle air distribution system to be fabricated from less costly components than are used in known vehicle air distribution systems.

Although the present invention is described below in reference to its application in connection with supplying air from a turbofan engine to a vehicle, such as an airframe, it should be apparent to those skilled in the art and guided by the teachings herein provided that with appropriate modification, the system and methods of the present invention can also be suitable for supplying air from any type of engine to any suitable destination.

Figure 1:
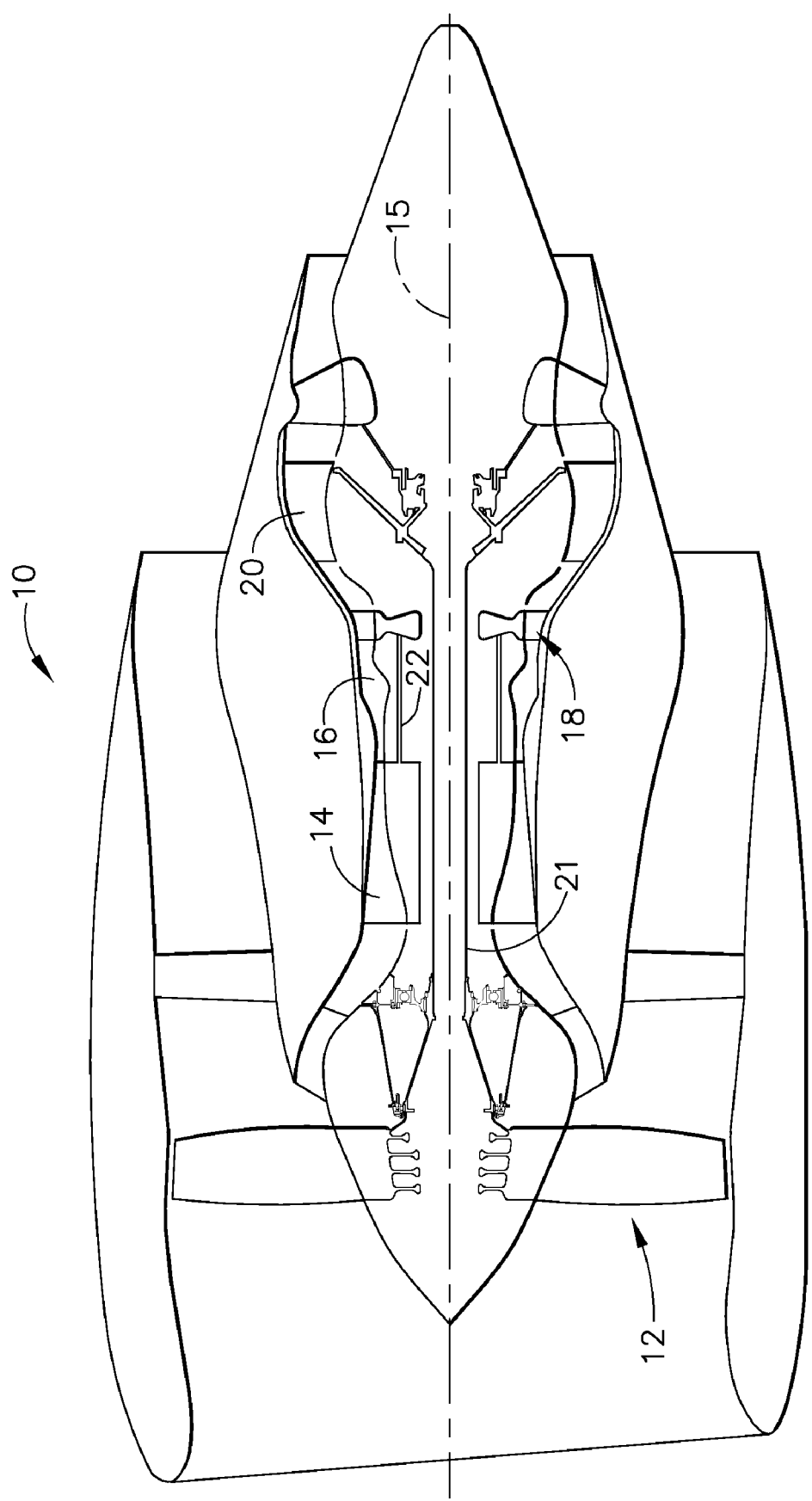
FIG. 1 is a cross-sectional view of an exemplary known turbofan engine assembly.

FIG. 1 is a schematic illustration of an exemplary turbofan engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22.

In operation, air flows through low pressure compressor 12 supplying compressed air from low pressure compressor 12 to high pressure compressor 14 and a bypass duct. Highly compressed air is delivered to combustor 16. Airflow from combustor 16 is channeled through a plurality of turbine nozzles to drive turbines 18 and 20, prior to exiting gas turbine engine 10.

Figure 2:
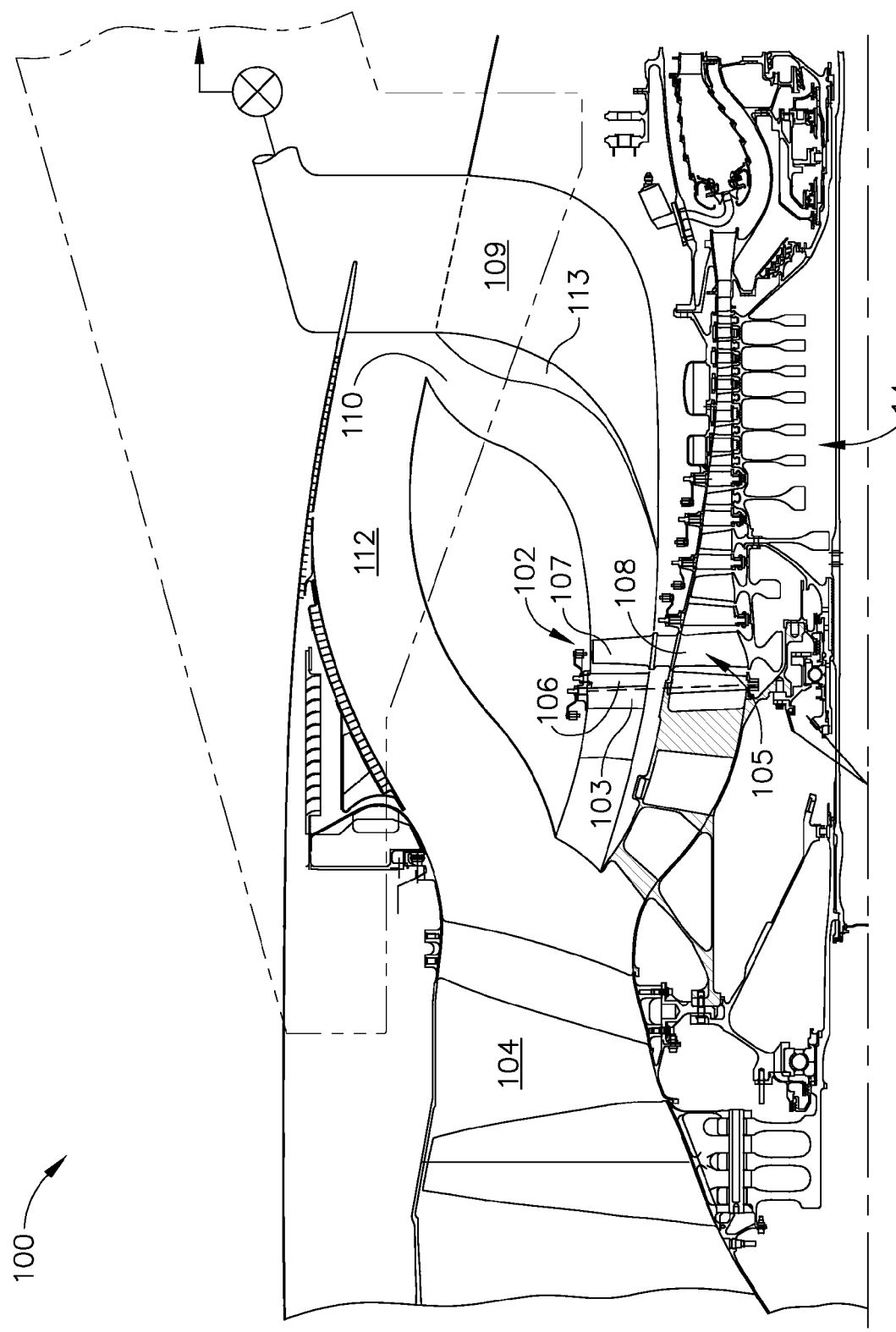
FIG. 2 is a cross-sectional view of a portion of an exemplary turbofan engine assembly including an air supply system.
Figure 3:
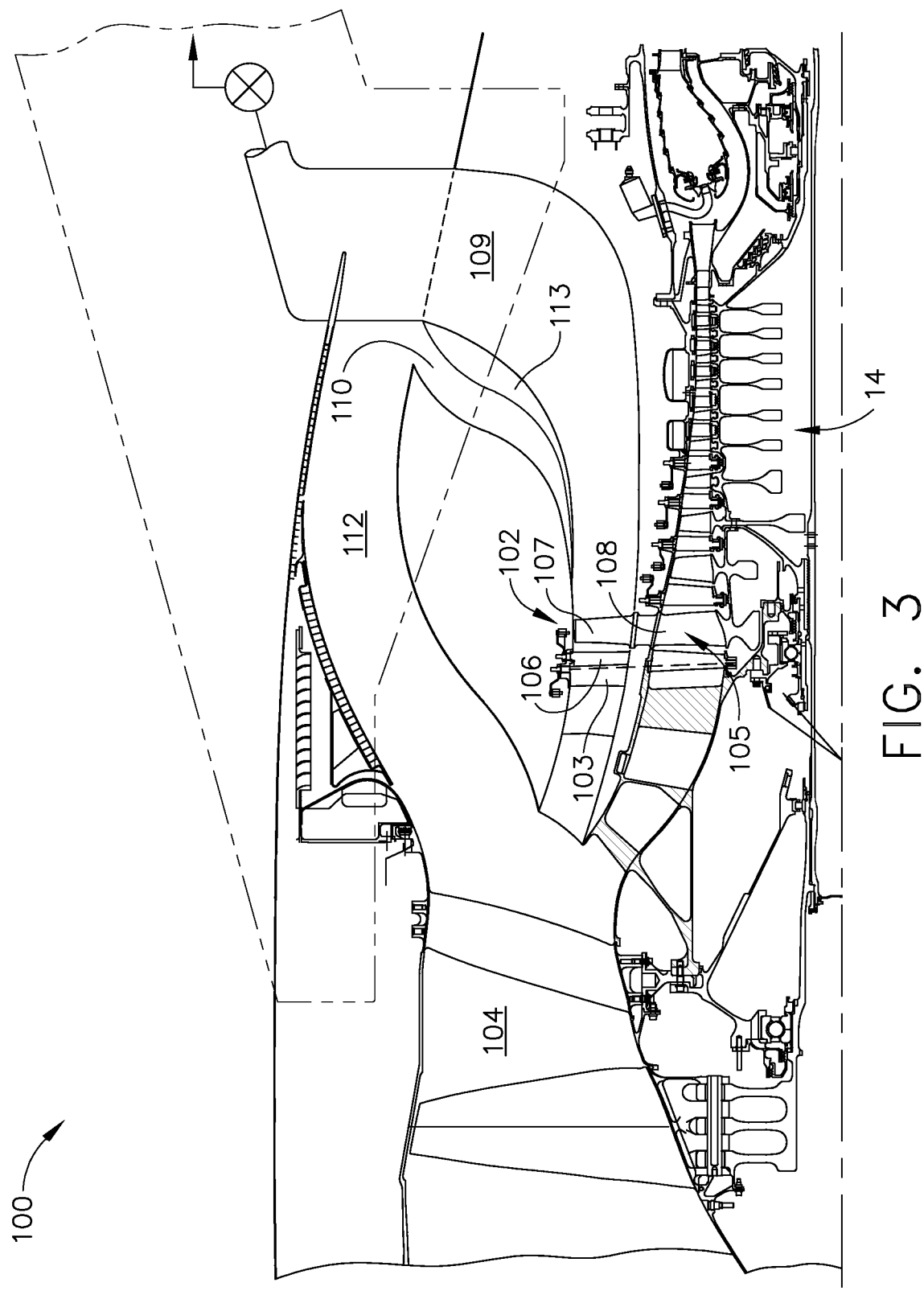
FIG. 3 is an alternative cross-sectional view of a portion of an exemplary turbofan engine assembly including an air supply system.

FIG. 2 is a cross-sectional view of a portion of an exemplary turbofan engine assembly 100. FIG. 3 is an alternative cross-sectional view of a portion of exemplary turbofan engine assembly 100. In the exemplary embodiment, turbofan engine assembly 100 is configured for use with a vehicle (not shown). Turbofan engine assembly 100 includes a core driven fan stage 102 that is mechanically coupled in parallel with a high pressure compressor 14. In the exemplary embodiment, as will be appreciated by one skilled in the art, high pressure compressor 14 may be modified to accommodate core driven fan stage 102 and function as described herein. More specifically, in the exemplary embodiment, an inlet 103 of core driven fan stage 102 is positioned between a fan assembly 104 and a first stage 105 of high pressure compressor 14. Core driven fan stage 102 includes inlet guide vanes 106 and a rotor 107 that is coupled in flow communication downstream from inlet guide vanes 106. In the exemplary embodiment, rotor 107 is mechanically coupled to and extends from a first rotor blade 108 of high pressure compressor 14. In one embodiment, outlet guide vanes are coupled downstream from rotor 107.

A collector duct 109 is coupled downstream in flow communication to core driven fan stage 102. Collector duct 109 is also coupled in flow communication with a plurality of connection ports (not shown) that are external to turbofan engine assembly 100 and fluidly coupled to systems of the vehicle. For example, in the exemplary embodiment, the connection ports are coupled to a vehicle air distribution system that is utilized to enhance the operational characteristics of high lift devices of the vehicle. Moreover, in the exemplary embodiment, a relief port 110 is coupled in flow communication with core driven fan stage 102. In the exemplary embodiment, relief port 110 is coupled radially outwardly from collector duct 109 and is also coupled in flow communication with a by-pass duct 112. In the exemplary embodiment, a valve 113 is positioned between collector duct 109 and relief port 110. Valve 113 is configured to channel air to either collector duct 109 or relief port 110. Specifically, FIG. 2 illustrates valve 113 configured to channel air to relief port 110; and FIG. 3 illustrates valve 113 configured to channel air to collector duct 109.

During operation, air from between fan assembly 104 and high pressure compressor 14 is channeled through core driven fan stage 102. In general, in the exemplary embodiment shown in FIG. 3, the air is channeled from core driven fan stage 102 through collector duct 109, and is then supplied to the vehicle air distribution system for use by high lift devices or other uses within the vehicle. Specifically, an amount of air through core driven fan stage 102 is independently controlled by inlet guide vanes 106. More specifically, a stagger of inlet guide vanes 106 is variable to selectively control the quantity of air flow through core driven fan stage 102, based on air flow requirements of the vehicle. For example, during high lift conditions, inlet guide vanes 106 are opened to allow a greater quantity of air to flow therethrough. In contrast, during low lift conditions, such as during forward flight conditions, for example, inlet guide vanes 106 are closed to limit an amount of discharge air flowing therethrough. In the exemplary embodiment, inlet guide vanes 106 are independently variable to allow air flow therethrough within a range approaching zero air flow to a maximum air flow required by the application of core driven fan stage 102. In the exemplary embodiment, inlet guide vanes 106 are mechanically actuated and operated by a main engine control. In an alternative embodiment, inlet guide vanes 106 are operated by any suitable mechanism.

Air channeled through inlet guide vanes 106 is routed towards rotor 107, wherein the pressure of the air flow is increased. Specifically, in the exemplary embodiment, rotor 107 facilitates increasing the pressure ratio of the maximum air flow within a range of 1.2 to 2.0. In an alternative embodiment, rotor 107 increases the pressure of the air within any suitable range.

The air is then channeled to collector duct 109 wherein the air is delivered to the vehicle air distribution system for use within the vehicle. Because the air is channeled from between fan assembly 104 and high pressure compressor 14, the air has a lower pressure in comparison to known systems that channel air from the high pressure compressor, but has a higher pressure in comparison to known systems that channel air from the fan assembly. Moreover, the air has a lower temperature than air that is channeled from the high pressure compressor. As such, rotor 107 is utilized to increase both the pressure and temperature of the air to within an optimal range. Accordingly, a vehicle air distribution system may be used that has smaller passageways than systems that channel air from the fan assembly. In addition, a vehicle air distribution system may be used that has components with a lower maximum operating temperature than components used with systems that channel air from the compressor. As such, the vehicle air distribution system requires less costly components, is less costly to fabricate, and/or requires less space in the vehicle, in comparison to known systems, thus reducing an overall cost of the vehicle, while increasing an efficiency of the vehicle.

In addition, in the exemplary embodiment, the vehicle may not require all of the air channeled from rotor 107. As such, in the exemplary embodiment shown in FIG. 2, air not needed by the vehicle is channeled through relief port 110 to by-pass duct 112. Air entering by-pass duct 112 is mixed with other by-pass air and is used by turbofan engine assembly 100 to enhance thrust production.

Turbofan engine assembly 100 facilitates providing high pressure air to systems of a vehicle while maintaining engine efficiency of the turbofan. Specifically, inlet guide vanes 106 enable the quantity of air from between fan assembly 104 and high pressure compressor 14 to be variably controlled based upon a need of the vehicle. Moreover, rotor 107 facilitates increasing the pressure of the discharge air, such that the pressure and temperature of the air falls within an optimal range. Specifically, a higher pressure air, in comparison to air from the fan assembly, enables the use of an air distribution system having physically smaller passageways in comparison to known air distribution systems that channel air from the fan assembly. Moreover, air not needed by the vehicle is mixed with other by-pass air and is used by turbofan engine assembly 100 to enhance thrust production. A lower temperature of air, in comparison to air from the compressor, enables the use of less costly materials, in comparison to systems that channel air from the compressor. As such, the vehicle air distribution system requires less costly components, is less costly to fabricate, and/or requires less space in the vehicle, in comparison to known systems, thus reducing an overall cost of the vehicle, while increasing an efficiency of the vehicle.

In one embodiment, a method of supplying air to a vehicle is provided, wherein the method includes modulating a flow of air from between a fan assembly of a turbofan engine and a high pressure compressor of the turbofan engine with a core driven fan stage coupled in parallel to the high pressure compressor. The method also includes channeling the air from the core driven fan stage to the vehicle.

While the invention has been described in terms of various specific embodiments, those skilled in the art will recognize that the invention can be practiced with modification within the spirit and scope of the claims.

What is claimed is:

1. A method of supplying air to a vehicle, said method comprising:
    modulating, using an inlet guide vane, a flow of air from between a fan assembly of a turbofan engine and a high pressure compressor of the turbofan engine with a core driven fan stage coupled in parallel to the high pressure compressor; and
    channeling the air from the core driven fan stage to the vehicle.

2. A method in accordance with claim 1 further comprising independently modulating the flow of the air between substantially zero air flow and a maximum discharge air flow.

3. A method in accordance with claim 1 further comprising channeling the air through a collector system to an external port of the engine for vehicle use.

4. A method in accordance with claim 1 further comprising channeling excess air not used by the vehicle through a relief port to a by-pass duct for use in engine thrust production.

5. A method in accordance with claim 1 further comprising increasing a pressure ratio of the core driven fan stage within a range of approximately 1.2 to approximately 2.

6. An air supply system for a vehicle having a turbofan engine including an inlet guide vane, said system comprising a core driven fan stage coupled in parallel with a high pressure compressor of the turbofan engine, at least one of said core driven fan stage and said inlet guide vane configured to modulate a flow of air from between a fan assembly of the engine and said high pressure compressor, said core driven fan stage further configured to channel the air to the vehicle.

7. A system in accordance with claim 6 wherein said inlet guide vane independently varies the flow of the air between substantially zero air flow and a maximum discharge air flow.

8. A system in accordance with claim 6 further comprising a collector system to channel the air to an external port of the engine for vehicle use.

9. A system in accordance with claim 6 further comprising a relief port configured to channel air not used by the vehicle to a by-pass duct for use in engine thrust production.

10. A system in accordance with claim 6 configured to increase the pressure ratio of the core driven fan stage within a range of approximately 1.2 to approximately 2.

11. A turbofan engine for a vehicle, said engine comprising:

a fan assembly;

a high pressure compressor; and an air supply system, said system comprising a core driven fan stage coupled in parallel with said high pressure compressor and an inlet guide vane, at least one of said inlet guide vane and said core driven fan stage configured to modulate a flow of air from between said fan assembly and said high pressure compressor, said core driven fan stage further configured to channel the air to the vehicle.

12. A turbofan engine in accordance with claim 11 wherein said inlet guide vane independently varies the air flow between substantially zero air flow and maximum discharge air flow.

13. A turbofan engine in accordance with claim 11 wherein said air supply system further comprises a collector system to channel the air to an external port of the engine for vehicle use.

14. A turbofan engine in accordance with claim 11 wherein said air supply system further comprises a relief port configured to direct air not used by the vehicle to a by-pass duct for use in engine thrust production.

15. A turbofan engine in accordance with claim 11 wherein said air supply system is configured to increase the pressure ratio of the core driven fan stage within a range of approximately 1.2 to approximately 2.

* * * * *